March 31, 1942.    G. DE W. GRAVES    2,278,350

POLYMERIC MATERIAL

Filed May 8, 1940

George DeWitt Graves
INVENTOR

BY Harold A. Jewett
ATTORNEY

Patented Mar. 31, 1942

2,278,350

UNITED STATES PATENT OFFICE 2,278,350

POLYMERIC MATERIAL

George De Witt Graves, Wilmington, Del., assignor to E. I. du Pont de Nemours & Company, Wilmington, Del., a corporation of Delaware Application May 8, 1940, Serial No. 334,081

16 Claims. (Cl. 174—125)

This invention relates to synthetic linear polyamides, and more particularly to the stabilization of synthetic linear polyamides toward atmospheric degradation at elevated temperatures.

This application is a continuation-in-part of application Serial No. 109,181, now U. S. P. 2,205,722, filed November 4, 1936.

Synthetic linear polyamides when exposed to the atmosphere at elevated temperatures undergo degradation which impairs those physical properties responsible for the toughness and flexibility characteristics of such substances. Ultra-violet light has a similar effect. The resulting brittleness may materially reduce the utility of objects containing synthetic linear polyamides, if, as is the case with electrical insulation, transparent film, bristles, cloth, coated fabrics and the like, much dependence is placed upon maximum retention of toughness and flexibility during fabrication and service.

It is the object of this invention to improve the flexibility retention, i. e. the resistance to embrittlement, of synthetic linear polyamides when exposed to elevated temperatures, particularly under atmospheric condition.

This object is attained by incorporating in a synthetic linear polyamide an amino-hydrogen-containing aromatic amine having at least two cyclic nuclei, preferably at least two aromatic carbocyclic nuclei having no unsaturated carbon atoms between the carbocyclic nuclei, the said amine having an "apparent oxidation potential" between 0.70 volt and 1.20 volts. The "apparent oxidation potential" of an organic compound is defined as the electromotive force of that reversible oxidation-reduction system which will oxidize a barely perceptible amount of the said organic compound, as more completely described by L. P. Fieser, J. Am. Chem. Soc. 52, 4915, 5204 (1930).

It has now been found that synthetic linear polyamides containing an amino-hydrogen-containing aromatic amine having at least two aromatic carbocyclic nuclei and an apparent oxidation potential (A. O. P.) between 0.70 volt and 1.30 volts, preferably between 0.80 volt and 1.20 volts, possess unusual resistance to embrittlement when exposed to elevated temperatures, retaining their characteristic toughness and flexibility for substantially longer periods than do the polyamides not similarly modified.

The synthetic linear polyamides with which this invention is concerned are the fiber-forming polyamides or superpolyamides described in U. S. 2,071,250; 2,071,253; 1,130,523 and 2,130,948. In general these polyamides have intrinsic viscosities above 0.4, where intrinsic viscosity is defined as in U. S. 2,130,948.

Although any of the above-designated aromatic amino compounds are suitable for preparing the improved polyamide compositions of the invention, phenyl-$\alpha$-naphthylamine, $\beta$-naphthylamine, diphenyl guanidine, and especially phenothiazine (sometimes referred to as thiodiphenylamine), are preferred by reason of the superior durability characteristics which they impart to the polyamides. The incorporation of the said compounds with a preformed synthetic linear polyamide may be effected by merely contacting the latter with a solution of one of the compounds. Any liquid may be used for forming the said solution, so long as it is at once a solvent for the desired aromatic amino compound and either a non-solvent or a softener for the polyamide. Aqueous ethanol has been found especially suitable, as also has dioxane. While the concentration of solute can be varied over the wide limits, it has been found most satisfactory to use three percent to six percent solutions, with the ratio of ethanol or dioxane to water adjusted to produce a substantially saturated solution of the amino compound. It is permissible to add the aromatic amino compounds in amounts up to about 10 weight percent to the preformed polyamide, but it is preferred to add them in lesser amounts, to wit 0.05%–5%. The amount incorporated will depend, however, upon the concentration and temperature of the solution, upon the time of contact, and upon the dimensions and shape of the preformed polyamide. In the case of films only 2 to 10 mils in thickness, whether unsupported or supported in intimate contact with wire, sheet metal, or fabric, suitable contact times for adding appropriate quantities of aromatic amino compounds from solutions of the above preferred composition are of the order of 1 to 12 hours at 25° C. and 1 to 30 minutes, usually 1 to 5 minutes, at 78° C.

An advantage gained from treatment according to the above described process is that by choosing conditions favorable to very short times of contact, the process can be operated continuously, thus effecting considerable economies in time and cost of handling. Further, the polyamides can be fabricated into practically any desired shape prior to their impregnation, and then impregnated in accordance with the above-described procedure, with any of the aforesaid aromatic amino compounds for which stable solutions can be made.

In those situations where it is advantageous, however, to add the aromatic amino compounds to the polyamide before the shaping of the latter, those of the aromatic amino compounds which are stable and non-reactive at the temperatures of linear superpolyamide formation—phenothiazine, for example—can be added directly to the initial polyamide-forming component or components prior to the manufacture of the polyamide, or to the molten polyamide, subsequently to its manufacture. The amounts of an aromatic amino compound which can be added in this way will be limited only by its solubility or dispersibility in molten polymer. Ordinarily, the preferred amounts are 0.05% to 5%.

The accompanying drawing illustrates a preferred embodiment of the invention.

Figure 1:
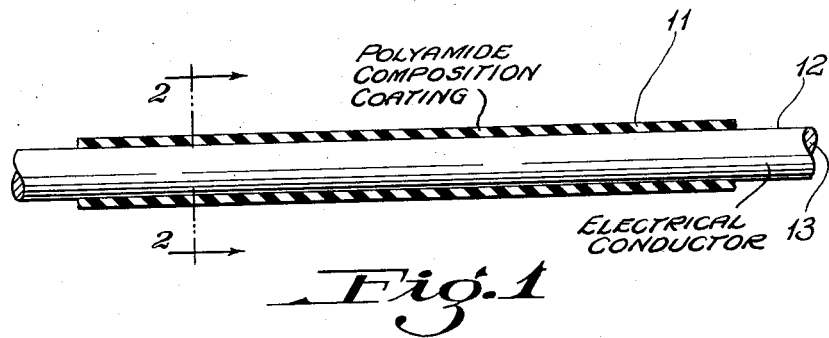
Fig. 1 represents, in longitudinal section, copper wire carrying, as electrical insulation, the composition set forth in Example I hereinbelow.

Referring particularly to Fig. 1, the coating 11, consisting of the said composition and being 2 mils in thickness throughout, envelops, and is in continuous contact with, the exterior 12 of the copper wire 13; the said copper wire being 22 gauge and suitable for use as a conventional electrical conductor.

Figure 2:
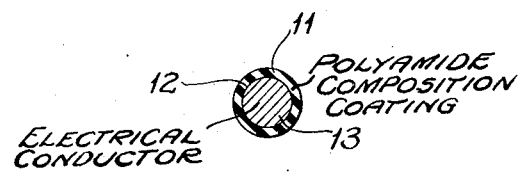
Fig. 2 is a transverse section through the coated wire of Fig. 1, taken on the line 2—2 thereof.

Referring particularly to Fig. 2, the aforesaid coating 11 again is shown in continuous contact with the exterior 12 of the aforesaid copper wire 13.

The following examples, in which parts are by weight, are illustrative of the methods by which this invention may be practiced.

*Example I*

A #22 B. & S. gauge copper wire having a coating of polyhexamethylene adipamide of intrinsic viscosity 0.9, two mils in thickness, is immersed for fifteen minutes in a solution prepared by mixing 5 parts commercial phenyl-α-naphthylamine, 1.5 parts adipodihydroxamic acid, 65 parts ethanol and 15 parts water, and maintained at 25° C. The wire is removed from the solution, passed rapidly through an ethanol wash bath maintained at 25° C., passed through a wiping device and allowed to air dry. This rapid washing serves to prevent the precipitation of excess amino compound on the surface of the wire coating. Obviously other liquids which are solvents for the amino compound but not for the polyamide can be used in place of ethanol. Upon exposure in air at 150° C. the coating of modified polyhexamethylene adipamide shows no tendency toward embrittlement after 96 hours, as demonstrated by complete absence of cracking when the wire is wound in a close coil on a $\frac{1}{32}$" mandrel, notwithstanding substantially complete removal of moisture by desiccation over phosphorus pentoxide. Under the same conditions of exposure and testing the coating on the original untreated coated wire, after 96 hours' exposure, develops cracks to such an extent that the coating is broken almost completely from the wire during the test.

Good results also are obtained by using β-naphthylamine in place of phenyl-α-naphthylamine, and sebacodihydroxamic acid in place of adipodihydroxamic acid.

*Example II*

A #22 B. & S. gauge copper wire having a coating of polyhexamethylene adipamide, two mils in thickness, is immersed for twelve hours in a solution prepared by mixing 5 parts commercial diphenyl guanidine, 1.5 parts adipodihydroxamic acid, 65 parts ethanol and 20 parts water, and maintained at 25° C. The wire is removed, passed rapidly through an ethanol wash solution maintained at 25° C., passed through a wiping device, and air dried. Upon exposure in air at 150° C. the coating of modified polyhexamethylene adipamide shows no tendency toward embrittlement during 96 hours, when tested as described in Example I, whereas the original unmodified coating cracks badly within 96 hours' exposure. When brought to moisture equilibrium at 50% R. H. at 25° C., prior to testing, a modified coating shows no tendency to crack in the $\frac{1}{32}$" mandrel test, after 144 hours' exposure in air at 150° C.; and after 250 hours only slight evidence of embrittlement can be found. An unmodified coat, on the other hand, will fail badly from embrittlement after less than 144 hours' exposure, if tested following such humidification.

*Example III*

A rectangular metal tank 5 ft. long. 1.5 ft. high and 0.5 ft. wide is provided with a tightly fitting cover having at each end a small opening provided with a reflux vapor condenser. Within the tank at each end is fitted a vertical row of ten freely running pulleys spaced to provide for the travel of 1000 continuous feet of copper wire. A copper wire 1000 feet in length is reeved through the pulleys, and three gallons of a solution comprising 5 parts commercial phenothiazine, 0.2 part β-phenyladipodihydroxamic acid and 100 parts ethanol is introduced. The solution is heated to 78° C. by means of an internal heater. To the end of the copper wire in the tank is spliced the end of a continuous length of #19 B. & S. gauge copper wire having a coating of polyhexamethylene adipamide, 2 mils in thickness. The coated wire then is pulled continuously through the bath at a rate of 500 ft./min., through a similar bath containing an ethanol wash solution, and then through a wiping device and an air dryer. Analyses for sulfur show that this treatment introduces into the polyhexamethylene adipamide coating about 2.5% phenothiazine. These coated wires can be exposed in air at 150° C. for 96 hours without embrittlement of the coat, when tested as described in Example I. Under the same conditions of exposure and testing the original unmodified coating begins to fail within 24 hours' exposure.

*Example IV*

A solution comprising 44 parts of interpolymer formed from equimolar amounts of hexamethylene diammonium adipate and ε-aminocaproic acid, 200 parts ethanol and 50 parts water, is heated to boiling, and there is mixed therein, partially in solution and partially in dispersion, 44 parts of commercial phenothiazine. The resulting hot dispersion is mixed with 1100 parts of polyhexamethylene adipamide of intrinsic viscosity 0.85 in the form of chips suitable for remelting, and the mixture is stirred until uniform distribution is apparent. The mixture then is air dried on shallow trays until the liquid surface film has set, and next is further dried in a conventional drier, to the required volatile content. The treated chip polymer thereupon is applied to #22 B. & S. gauge copper wire by melt extrusion. Wire coats prepared by this method contain 2% phenothiazine, as indicated by sulfur analyses. These wire coats 2 mils, 5 mils, and 8 mils in thickness will withstand heating in air at 150° C. without evidence of embrittlement for 96 hours, 96 hours and 48 hours, respectively, while under identical conditions control wire coats from ordinary polyhexamethylene adipamide show failure before 72 hours, 48 hours, and 24 hours for 2 mil, 5 mil and 8 mil coats respectively.

*Example V*

An intimate mixture of 50 parts hexamethylene diammonium adipate, 0.675 part hexamethylene diammonium acetate (viscosity stabilizer) and 0.76 commercial phenothiazine, is sealed in vacuo and heated for 2 hours at 215°–220° C., then heated at atmospheric pressure in the presence of an inert atmosphere for one hour at 285° C., and finally heated under reduced pressure for one hour at 285° C. The resulting modified polyhexamethylene adipamide is a tough, hard, slightly greenish solid, melting sharply at 262° C. and having an intrinsic viscosity of 0.80. This superpolyamide, when melted, can be spun into fibers capable of being cold drawn, and can be pressed into films by subjection to pressure at temperatures near the melting point. If the polyamide is thus pressed into a film 5 mils in thickness, and then is exposed in air at 150° C., 48 hours will elapse before embrittlement or serious loss of tensile strength can be observed, whereas a similar film, formed from ordinary polyhexamethylene adipamide, shows serious loss in toughness, flexibility and strength within two hours upon exposure in air at 150° C.

*Example VI*

Cold drawn bristles 14 mils in diameter, consisting of polyhexamethylene adipamide, are soaked 12 hours at 25° C. in a saturated solution of phenothiazine in ethanol. The treated bristles are washed with ethanol and air dried. After 12 hours' exposure in air at 125° C. the bristles are tested for fatigue resistance, and are found to be far superior to the original untreated bristles in resisitance to fatigue.

The fatigue resistance may be tested for by assembling a closely packed tuft of bristles, about 1/8" to 1/4" in overall diameter, clamping the tuft in a 1/16" plate so that a 3/4" length protrudes and flexing the tuft laterally for an hour at the rate of 1725 times/min. The fatigue resistance index is then calculated as:

$$F.I. = \left(\frac{U+1/2D}{U+D+B}\right) \times 100$$

where

U=number of undamaged bristles
D=number of damaged bristles
B=number of broken bristles According to this definition, the fatigue resistance index of the bristles treated in Example VI was 29, while the said index for the original untreated bristles was only 9.5.

As additional examples of polyamides which can be improved by the present invention may be mentioned polyhexamethylene sebacamide, polydecamethylene adipamide, poly-m-phenylene sebacamide, 6-aminocaproic acid polymer, 12-amino-stearic acid polymer, and interpolyamides, e. g., those derived from hexamethylenediamine, decamethylenediamine, adipic acid and sebacic acid, and those derived from hexamethylenediamine, adipic acid and caprolactam or 12-amino-stearic acid.

It is desirable, when using the polyamide-aromatic amine compositions of the invention in conjunction with or on metals—for example, as coatings on wire—to incorporate a hydroxamic acid of low volatility with them. Conspicuously good results have been obtained with dihydroxamic acids containing at least four contiguous atoms between the substituted carboxyl groups. Since dihydroxamic acids generally are not stable under conditions of linear polyamide formation, the addition of those substances to the improved polyamides can be most effectively accomplished by impregnation from solutions of the dihydroxamic acids. A preferred method consists in adding to solutions of aromatic amino compounds, used as described above, dihydroxamic acid in amounts of 0.5 gram to 20 grams per liter of solution, preferably 0.5 and 5 grams per liter of solution.

The above mentioned dihydroxamic acids can be prepared by reacting an ester of the corresponding dicarboxylic acid with hydroxylamine in the presence of an alkali at a temperature below the decomposition temperature of the hydroxylamine. Thus, adipodihydroxamic acid

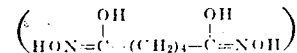

is prepared by reacting diethyl adipate with hydroxylamine in a methanol solution of sodium methylate at ordinary temperatures. After standing for 15 hours the volatile constituents are distilled off under reduced pressure, leaving the sodium salt of adipodihydroxamic acid as a residue. The free acid is obtained by dissolving the salt in a small amount of water and adding concentrated hydrochloric acid. On cooling the solution to subnormal temperatures, adipodihydroxamic acid separates as a crystalline precipitate. It melts at 164° C.

The compositions of the invention not only exhibit improved resistance to embrittlement, together with enhanced durability generally, on exposure to heat but also preserve for greatly increased periods the initial high molecular weight of the polyamides as determined by intrinsic viscosity measurements. The toughness and strength of the polyamides increases with the molecular weight (intrinsic viscosity).

The increased durability can be demonstrated by superior performance under test. For example, thin films of these polyamides applied as insulation over copper wire will show pronounced resistance to cracking, even after exposure to severe embrittlement-producing conditions, when the coated wire is wound in a close coil formed on a mandrel near the wire size in diameter. Unsupported unoriented films, after similar exposure, likewise exhibit pronounced resistance to cracking, when bent sharply through a 180° angle. Oriented films, moreover, show substantially increased tear resistance parallel to the axis of orientation; and bristles manifest greatly increased fatigue resistance.

It is not intended to limit the invention to the examples cited. The selected aromatic amino compounds used in this invention advantageously can be incorporated either in synthetic linear polymers which contain recurring amide or thioamide linkages as an integral part of the main chain of atoms in the polymers, or with reactants forming such linear polyamides. In addition to bifunctional polyamide-forming reactants, such as amino acids or dibasic acids and diamines, there can be used to prepare the improved polyamides other bifunctional polymer-forming reactants such as polyester-forming reactants, e. g. hydroxy acids, and amino alcohols; or the polyamides derived therefrom can be treated with the selected aromatic amino compounds. Reactants of the types listed above all yield linear polymers containing a plurality of amide linkages, which yield upon hydrolysis with a mineral acid the bifunctional polyamide-forming reactants from which they are derived, or polyamide-forming derivatives thereof. Thus, a polyamide prepared with the use of a diamine and a dibasic carboxylic acid yields, on hydrolysis with hydrochloric acid, a diamine hydrochloride and dibasic carboxylic acid, whereas a polyamide prepared with the use of an amino acid will yield a monoaminomonocarboxylic acid hydrochloride.

The polyamides which it is desired to improve by the practice of this invention may, during the treatment, be in any of various forms, as, for example, filaments, textile fabric, mouldings, castings, foils, and films. The films may either be supported on or carried by, filaments, textile fabrics, wood, rubber, leather, ceramic materials, and so forth. These articles can be made by any of the means suitable for the fabrication of polyamides, for instance by application from melt, solution, dispersion, or as an organic frit. Polyamides in various forms can be subjected, prior to the treatments of this invention, to various other treatments, including setting in steam or hot water. The improved polyamide compositions can be fabricated into numerous forms, shapes and products, such as illustrated, for example, by those just listed, and can be subjected to the mechanical operations, including stamping, punching, rolling, drawing, turning, embossing, and calendering.

The compositions of the invention may be modified by the addition of other materials. Suitable modifying agents include plasticizers, resins, waxes, pigments, fillers, dyes and ultraviolet opacifiers. The form and use of the polyamide will determine which of these modifying agents are the more suitable.

The aromatic amino compounds used in this invention may contain non-condensed aromatic nuclei, e. g. diphenylamine A. O. P. 1.008 volts, condensed nuclei, e. g., $\beta$-naphthylamine A. O. P. 1.064 volts, or both non-condensed and condensed nuclei, e. g. phenyl-$\alpha$-naphthylamine A. O. P.= 0.880 volt. Connecting atoms between aromatic carbocyclic nuclei may be saturated carbon atoms, hetero-atoms e. g., diphenylamine, mixed saturated carbon atoms and hetero-atoms, e. g., sym.diphenylethylenediamine, A. O. P.=0.960 volt, or there may be no connecting atoms between aromatic carbocyclic nuclei, e. g., 2-aminodiphenyl, A. O. P.=ca. 1.08 volts. Heteroatoms between aromatic carbocyclic nuclei may be saturated or unsaturated, e. g., diazoaminobenzene, A. O. P. 1.058 volts; and there also may be heterocyclic nuclei, e. g., phenothiazine or thiodinaphthylamine. As hetero-atoms might be mentioned nitrogen, sulfur and oxygen. The aromatic amino compounds may be monoamines or polyamines. The aromatic carbocyclic nuclei may contain a number of substituents including aliphatic radicals, saturated and unsaturated such as methyl, ethyl, octyl, stearyl, vinyl, allyl, and oleyl; saturated carbocyclic nuclei such as cyclohexyl; saturated or unsaturated heterocyclic nuclei such as pyridyl and piperidyl; and a number of other substituents including substituted and unsubstituted amino groups, such as the mono alkyl amino groups, methyl amino, ethyl amino, cyclohexyl amino and stearyl amino, the di-alkyl amino groups, dimethyl amino, diethyl amino, methyl ethyl amino, and the like. Other suitable substituents are hydroxyl, or saturated or unsaturated alkoxy groups, such as methoxy, ethoxy, allyloxy and the like. Heterocyclic nuclei also may contain these substituents. Any of the above indicated alterations in structure may be performed on the aromatic amino compounds suitable for preparing the improved polyamides of this invention, to yield another suitable aromatic amino compound, provided that the product of the structural alteration has an apparent oxidation potential between 0.70 volt and 1.30 volts, preferably between 0.80 volt and 1.20 volts.

When preformed polyamide is used as a starting material, and an aromatic amino compound is incorporated therein from solution, process variables such as nature of solvent, composition of solution, temperature of solution, and time of contact between polymer and solution are interdependent and therefore require adjustment, with reference to the size and shape of the particular preformed polyamide, in order that the desired amount of aromatic amino compound shall be incorporated in the polyamide. It can be determined from physical laws that the amount of aromatic amino compound incorporated in a unit of time will depend directly upon the surface-volume ratio, and inversely upon the thickness of the solid. These factors are of especial importance in the rapid performance of continuous processes.

Solvents suitable for use in the solution process may include any of the solvents for the selected aromatic amino compounds which are non-solvents for the polyamide. It is preferable, however, that the solvent chosen be a liquid which will soften the polyamide. The selection of the most suitable solvent will depend upon the solubility characteristics of the aromatic amino compound. In most cases, however, ethanol or dioxane will be found particularly appropriate. While the solutions may vary in composition from moderately dilute to saturated, saturated solutions generally are most suitable. The temperatures of the solutions can be varied over limits, depending upon the amount of aromatic amino compound to be incorporated and upon the physical properties of the solvent. As a rule, elevated temperatures are preferred. The time of contact between the polymer and the solution will depend upon the composition of the solution and the tempertaure. Using 5 weight percent saturated solutions in aqueous ethanol at 78° C. contact times in excess of 20 seconds are suitable for 2 mil polyamide films over copper wire. At 25° C. a contact time in excess of 15 minutes is preferable, although shorter periods can be used. When a dihydroxamic acid is to be used in conjunction with an aromatic amino compound, a suitable amount is that necessary to react with the metal, intimately in contact with the polyamide. Being composed of carbon, hydrogen, oxygen and nitrogen, as is the polyamide, and being added in very small quantities, it is very difficult to detect the amount of dihydroxamic acid added. Preferably, therefore, the quantity is regulated by adjusting the solution concentration of dihydroxamic acid in fixed ratio to the amount of aromatic amino compound therein, and while the concentration of dihydroxamic acid can be as high as one-half the amount of aromatic amino compound or higher, it is preferred that the acid-amine ratio be between 0.01 and 0.1.

The improved polyamides of this invention can be converted into any of the forms suitable for polyamides generally, such as yarns, tire cord, bristles, fabrics, molded articles, films, and coatings, e. g., for filaments, textiles, wood, rubber, leather, and ceramic materials, and are particularly useful in the above forms, when intended to be exposed to elevated temperature. Thus, they form especially valuable textile fabrics, by reason of their stability toward the high temperatures encountered in laundering, calendering and ironing operations. By reason of their excellent durability, the compositions of the invention are especially useful, also, for electrical insulation—e. g. as coatings for magnet wires, electric blasting cap leading wires, and slot insulation for motors—movie film, sausage casings, and as coatings for materials which are exposed to elevated temperatures.

As many apparently widely different embodiments of this invention may be made without departing from the spirit and scope thereof, it is to be understood that I do not limit myself to the specific embodiments thereof except as defined in the appended claims.

I claim:

1. A composition of matter comprising a synthetic linear polyamide and an amino-hydrogen-containing aromatic amine, the said amine having at least two cyclic nuclei and an apparent oxidation potential between 0.70 volt and 1.30 volts.

2. A composition of matter comprising a synthetic linear polyamide and an amino-hydrogen-containing aromatic amine, the said amine having at least 2 aromatic carbocyclic nuclei and an apparent oxidation potential between .80 volt and 1.20 volts.

3. A composition of matter comprising a synthetic linear polyamide, a hydroxamic acid of low volatility, and an amino-hydrogen-containing aromatic amine, the said amine having at least two cyclic nuclei and an apparent oxidation potential between 0.70 volt and 1.30 volts.

4. A composition of matter comprising a synthetic linear polyamide, a dihydroxamic acid, and an amino-hydrogen-containing aromatic amine, the said amine having at least two cyclic nuclei and an apparent oxidation potential between 0.70 volt and 1.30 volts.

5. A composition of matter comprising a synthetic linear polyamide having an intrinsic viscosity above 0.4 and an amino-hydrogen-containing aromatic amine, the said amine having at least 2 aromatic carbocyclic nuclei and an apparent oxidation potential between .80 volt and 1.20 volts; the said composition also containing a dihydroxamic acid having 4 contiguous atoms between the substituted carboxyl groups.

6. The composition of claim 5 wherein the aromatic amino compound is phenothiazine.

7. Filaments, films and the like comprising a synthetic linear polyamide and an amino-hydrogen-containing aromatic amine, the said amine having at least two cyclic nuclei and an apparent oxidation potential between 0.70 volt and 1.30 volts.

8. An article of manufacture comprising an electrical conductor carrying an insulating coating comprising the composition of claim 1.

9. An article of manufacture comprising an electrical conductor carrying an insulating coating comprising the composition of claim 5.

10. An article of manufacture comprising an electrical conductor carrying an insulating coating comprising synthetic linear polyamide and phenothiazine.

11. The composition of claim 2 wherein the said amino-hydrogen-containing aromatic amine is phenyl-α-naphthylamine.

12. The composition of claim 2 wherein the said amino-hydrogen-containing aromatic amine is β-naphthylamine.

13. The composition of claim 2 wherein the said amino-hydrogen-containing aromatic amine is phenothiazine.

14. The composition of claim 5 wherein the said dihydroxamic acid is adipodihydroxamic acid.

15. The composition of claim 5 wherein the said dihydroxamic acid is β-phenyladipodihydroxamic acid.

16. The composition of claim 5 wherein the said dihydroxamic acid is sebacodihydroxamic acid.

GEORGE DE WITT GRAVES.